Patented May 8, 1934

1,957,912

UNITED STATES PATENT OFFICE 1,957,912

MOISTURE RESISTANT FIBROUS MATERIAL

Paul C. Seel, Rochester, N. Y., assignor to Eastman Kodak Company, Rochester, N. Y., a corporation of New York No Drawing. Application December 24, 1929, Serial No. 416,284

2 Claims. (Cl. 91—68)

This invention relates to fibrous materials and particularly to such materials which have been rendered moisture resistant.

In the manufacture of sheet materials such as paper, cardboard and other products of a fibrous nature, it is often required that this material be so treated that its moisture absorption be reduced to a minimum. Tissue paper, for instance, after coating with paraffin, is used extensively for wrapping foods and other materials to protect them from moisture. Paper cartons and corrugated cardboard containers have been treated with various types of resin sizing material and other compositions to render their surface more resistant to moisture, thus increasing the useful life of these containers.

While cellulose nitrate has been used to a limited extent for such purposes, its use has been somewhat in question, due to its high inflammability which is imparted to a greater or less degree to the material upon which it has been applied. Its employment, therefore, for this purpose has not been extensive. Other esters of cellulose have been proposed but have not proven particularly suitable. Commercial acetone-soluble cellulose acetate, for instance, due to its moisture absorption characteristics, has not been extensively employed for these purposes; while the chloroform-soluble cellulose triacetate has high moisture resistance, it has not had universal use, due to the brittleness of the films resulting from coating a solution of it and also from the toxic qualities of the solvents which are necessary for its solution.

I have found that by treating fibrous materials with a particular moisture resistant cellulose acetate, products having heretofore unexpected resistance thereto may be obtained. The type of the cellulose acetate which I prefer to use is of the acetone-soluble variety which has been hydrolyzed to a particular degree, thus rendering it much more resistant to moisture than cellulose acetate hydrolyzed by the usual process. The acetyl content of such an acetate will run in the neighborhood of from 38 to 42% acetyl, and the acetate may be prepared in the manner described below.

This type of acetate, when coated on tissue paper either by immersion or by passing the paper between impregnating rolls, gives unusual water resistance and is useful in the arts for the packing of food products, particularly those which become less palatable after contact with moisture.

This cellulose acetate may likewise be used for the impregnation of fibers which are to be used as insulating materials. Such fibers will retain their individuality and separate structures even when subjected to moist conditions for an extended period of time. This latter impregnation may be carried out by malaxing ground cellulose acetate into the fibers; when the material has been formed in sheet or other shapes the cellulose acetate may then be dispersed through the fibrous materials by the application of heat. A simpler means of impregnation may be accomplished by immersion of the fibers in a suitable concentration of the cellulose acetate in a solvent with or without the presence of plasticizers and the evaporation therefrom of the more volatile constituents.

The cellulose acetate which I prefer to use is obtained by stopping the hydrolysis of the cellulose acetate when approximately 90% or more of a sample isolated from the hydrolyzing solution, precipitates in a mixture of 40% water and 60% acetone by volume, when carried out in the manner described below. Cellulose acetate which has been accurately hydrolyzed to this degree has attained exceptional qualities of water resistance and good flexibility which are not shown by any other cellulose acetates which are soluble in acetone. Furthermore, the addition of phenyl or ortho cresyl para toluene sulfonate, triphenyl phosphate or tricresyl phosphate to a cellulose acetate having a precipitation value of 90–97 per cent will increase even further the moisture resistance of the cellulose acetate. Above 97 per cent precipitation value little or no added moisture resistance will be effected by such an addition and any of the usual plasticizers may be employed with this exceedingly high precipitation value acetate to impart the desired plasticity, very slight, if any, additional moisture resistance being effected by their presence.

In order that the method of determining this particular point in the hydrolysis of the cellulose acetate may be more thoroughly understood the exact method used is here disclosed: A sample of the cellulose acetate which has been removed from the hydrolyzing reaction mixture is dried under standard conditions; to 5.00 grams of this dried cellulose acetate there are added 100.0 cc. of acetone of 99% or better,—the whole being stirred until a homogeneous mixture results. The container in which the solution is being effected is closed. To this dope is added slowly from a pipette and with thorough stirring 150.0 cc. of a solution consisting of two parts of distilled water and one part of acetone by volume. Care should be taken to keep the solvents and mixtures at a temperature of 20°±1° C., wherever volumes are being measured.

At the end of the addition of the acetone-water solution, a mixture is obtained containing 40% water by volume (neglecting contraction) in which is suspended the precipitated cellulose acetate. This is allowed to stand for 12 hours at 20° C., and 25 cc. of the clearest supernatant solution are removed with a pipette. At the end of this time, precipitation has reached equilibrium and proceeds no further. This 25 cc. portion is centrifuged in a stoppered bottle at a high speed until the liquid is perfectly clear. Exactly 5 cc. of the liquid are removed with a pipette and evaporated to dryness on a tared watch glass. If W is the weight of the residue in grams, the "precipitation value" which equals the percent cellulose acetate precipitated will equal $$= 100 - W \times \frac{250}{5} \times \frac{1}{5} \times 100$$
$$= 100 - 1000W$$

I have found that products coated or impregnated with a hydrolyzed cellulose acetate having a precipitation value in the above test of 90% or better, has exceptionally high water resistance and a good degree of flexibility. It is, therefore, but necessary so to control the hydrolysis by suitable hydrolyzing baths that the cellulose acetate may be accurately and consistently deacetylated to the prescribed precipitation value in order to produce materials having these advantages. One method of so controlling this hydrolysis is described in the pending application of C. J. Malm, Serial No. 325,597, filed December 12, 1928, which relates to a hydrolysis in which not more than three-fifths of 1% of sulphuric acid is present in the bath and in which the hydrolysis is carried out for a period of time exceeding four days at a temperature of less than 105° F.

The precipitation value of 90% or more may be obtained by the usual hydrolyzing methods, such as indicated below, providing, of course, that the hydrolysis be stopped at the correct point. When this point has been reached, it is often very difficult instantly to stop further hydrolysis of the cellulose acetate so that the resulting product will not have a precipitation value of less than 90%. Accurate and substantially instantaneous stopping of the hydrolysis may be effected by the process as described in the pending application of C. J. Staud and J. T. Fuess, Serial No. 398,807, which discloses the stopping of hydrolysis by adding a neutral salt of an alkali metal to the hydrolysis bath. Other methods of effectively controlling the hydrolysis in order that it may be stopped when the product has the required precipitation value, may be employed. The following hydrolyzing processes which I call the "acid final" or "water final" have proved efficient. In the "acid final" type of hydrolysis mineral acids (i. e. hydrochloric or sulfuric acid) are added with acetic acid and water to the so-called "first stage" cellulose acetate "dope": i. e., the cellulose acetate solution attained at the end of the acetylating step, usually a solution of a fully acetylated cellulose. The amount of mineral acid added should be so adjusted that the time of hydrolysis required is from 30 to 50 hours at a temperature of 95 to 100° F. At this temperature, it is somewhat difficult at all times to regulate the exact time at which the hydrolysis should be stopped, as noted above, to give a precipitation value of 90%; at a lower temperature, however, of say 70° F., the time of treatment is increased to from 5 to 10 days with the resultant increase in the accuracy of control.

Of the two hydrolyzing processes, I prefer, however, to use the "water final" method which I will now describe. This may be carried out by the use of acetic acid and water without the addition thereto of further mineral acid catalysts, as the catalysts from the "first stage" of the acetylation are usually sufficient. At a temperature of 70° F., hydrolysis conducted in this manner will require 20 to 25 days to obtain a product having a precipitation value of approximately 90%; at a temperature of 90° to 100° F., the time will be reduced to from 8 to 12 days. It is apparent that with the long period of hydrolysis, as here described, and by the use of the process of Staud and Fuess for the stopping of the hydrolysis, accurate deacetylation of the cellulose acetate may thus be obtained.

After hydrolysis, the cellulose acetate may be isolated, washed, and dried by any of the usual processes. It may then either be ground in the dried condition and added to the fibrous materials or dissolved in a suitable solvent composition, with or without the presence of fluid restraining agents, plasticizers and similar conditioning ingredients and either coated upon, or impregnated into the fibrous material in sheet or other form.

In the claims hereunto appended, where reference is made to the "precipitation value" of the cellulose acetate to be employed it will be distinctly understood that such "value" is a physical characteristic of the cellulose acetate which is to be determined in accordance with the method above set forth in detail. The fact that the method of determining the precipitation value should be followed closely is not, of course, to be understood as limiting the scope of the invention since that is limited only by the specified range of the precipitation value of the cellulose acetate to be employed.

What I claim as my invention and desire to be secured by Letters Patent of the United States is:

1. A wrapping sheet having an unusual degree of resistance to moisture comprising thin paper impregnated with a mixture comprising an acetone-soluble cellulose acetate having a precipitation value of at least 90% and orthocresyl para-toluene sulfonate.

2. A moisture-resistant composition which comprises a fibrous material which has been impregnated with a mixture comprising acetone-soluble cellulose acetate having a precipitation value of at least 90% and o-cresyl para toluene sulfonate.

PAUL C. SEEL.